Sept. 28, 1954  J. N. MARSHALL  2,690,556
AIRCRAFT ALTITUDE INDICATING SYSTEM
Filed Jan. 30, 1951
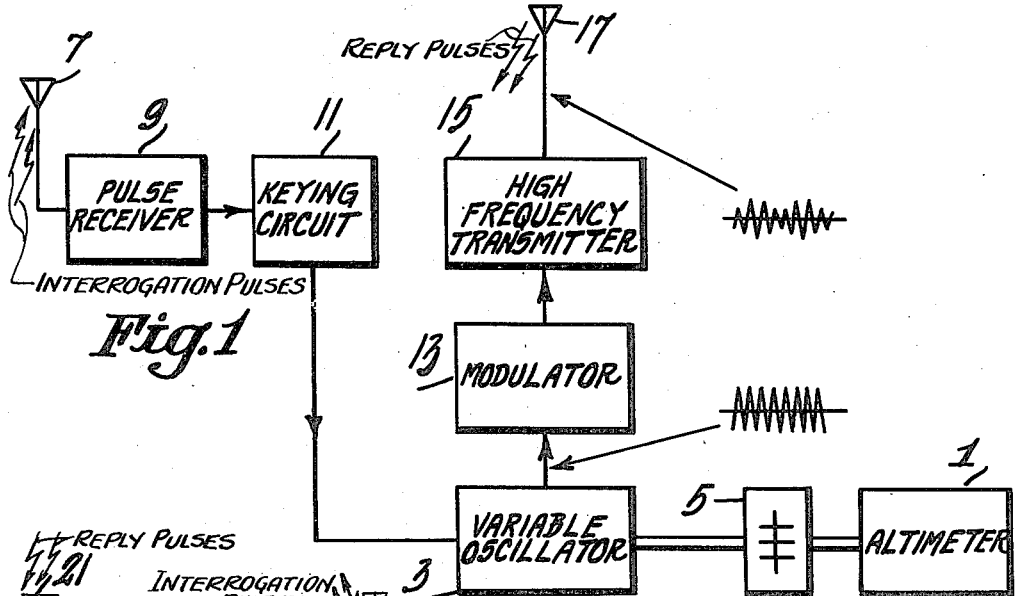
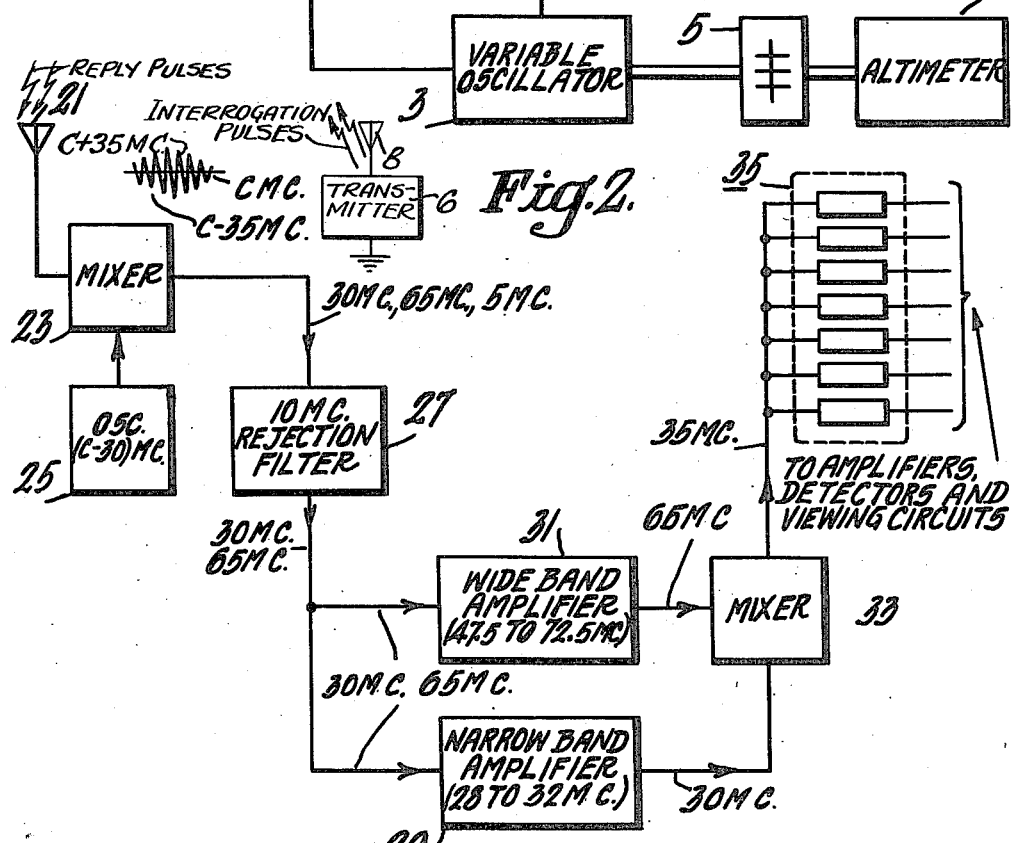
INVENTOR
John Nathaniel Marshall
BY
ATTORNEY Patented Sept. 28, 1954

2,690,556

UNITED STATES PATENT OFFICE 2,690,556

AIRCRAFT ALTITUDE INDICATING SYSTEM

John N. Marshall, Philadelphia, Pa., assignor to Radio Corporation of America, a corporation of Delaware Application January 30, 1951, Serial No. 208,472

9 Claims. (Cl. 343—13)

This invention relates generally to navigation systems and more particularly to an aircraft altitude indicating system in which the frequency of a sub-carrier signal transmitted by an aircraft enables a ground control station to determine accurately the aircraft's altitude.

Previously known altitude indicating navigation systems, operable in response to radar beacon interrogation of aircraft by a ground control station generally use complicated pulse codes which may be inaccurate when aircraft are relatively close to the radar beacon. Some systems excessively utilize already crowded frequency spectra by requiring large frequency variations of a high-frequency carrier.

An altitude indicating system is described in U. S. Patent 2,527,967, granted to Harold J. Schrader on October 31, 1950. According to said patent, in response to a radar interrogation, an aircraft transmits an altitude coded reply pulse which is filtered by the ground station and applied to one of a plurality of P. P. I. circuits assigned to aircraft at a particular altitude level. A television multiplexing system transmits the plurality of P. P. I. (planned position indicator) displays to aircraft at selected altitude levels. Aircraft at those selected levels receive a P. P. I. display indicating craft flying at their particular level.

Obtaining altitude information by radio communication consumes much valuable time and frequency spectra which may well be used to better advantage by both ground and aircraft personnel. There is also the possibility that the communication radio in a particular aircraft may be inoperable. With an altitude indicating system, as is disclosed according to present invention, the ground station may determine that aircraft's altitude and accordingly advise other aircraft having flight patterns corresponding to that of the aforementioned aircraft. In a situation as above described it may be possible to ascertain, a short distance, the altitude of aircraft by triangulation, but such methods are relatively slow and inaccurate.

In general, aircraft altitude indicating systems require complicated pulse codes in order that the systems be free from spurious responses. The use of a complicated pulse code, however, enhances the probability of lost responses.

According to the instant invention these difficulties are obviated by an aircraft altitude indicating system in which a radar beacon interrogates an aircraft and, at the aircraft, causes a reply pulse to be transmitted which is frequency-modulated by the aircraft altimeter.

An object of the invention is to provide an improved aircraft altitude indicating system.

Another object of the invention is to provide an improved altitude indicating system that is relatively free from frequency instability.

A further object of the invention is to provide an improved aircraft altitude indicating system responsive to radar beacon interrogation.

In accordance with the present invention, there is disclosed a typical system in which a ground control station may accurately determine the altitude of a given aircraft when the aircraft is interrogated by a ground control station radar beacon.

In the aircraft, the circuitry includes a normally quiescent variable frequency oscillator including a variable tuned circuit coupled to the aircraft altimeter. The coupling between the variable tuned circuit and the altimeter is such that the instantaneous resonant frequency of the variable oscillator, as determined by the variable tuned circuit, varies as a function of the indicated altimeter reading.

Upon interrogation of the aircarft by a ground control station radar beacon, the interrogating pulses are received at the aircraft and actuate a keying circuit. The keying circuit output pulse excites the normally quiescent variable frequency oscillator at the instantaneous resonant frequency of the variable tuned circuit. The output from this variable oscillator constitutes a sub-carrier signal, the frequency of which denotes the altitude of the interrogated aircraft. The altitude indicating sub-carrier signal is coupled to a modulator unit which amplitude-modulates the output of a high-frequency transponder reply transmitter. The high-frequency transmitter then transmits the amplitude-modulated carrier to the interrogating ground station as a reply pulse.

At the ground station, the reply pulse is received and heterodyned with a fixed frequency oscillator output that is approximately 30 megacycles below the reply pulse high-frequency carrier. Thus the fixed frequency signal beats with the high-frequency carrier signal, and the upper and lower sideband frequency signals. The sum frequencies and the lower sideband difference frequency serve no useful purpose and are therefore discarded. The upper sideband and carrier difference frequencies are selectively filtered, separately amplified, and then mixed together. The difference frequency signal frequency generated in the mixing action is equal to the frequency of the altitude indicating sub-carrier signal. The demodulated reply pulse is thence coupled to circuits for filtering, amplifying, detecting, and interpreting by a calibrated altitude indicating device.

The invention will be described in greater detail with reference to the accompanying drawing of which Figure 1 is a schematic block diagram, according to the invention, of altitude indicating system equipment located aboard an aircraft; and Figure 2 is a schematic block diagram of ground station equipment for the altitude indicating system of the invention.

Referring to Figure 1 of the drawing, the aircraft altimeter 1 is coupled to a variable tuned circuit which comprises part of a normally quiescent variable frequency oscillator 3. The coupling between the tuned circuit and the altimeter 1 herein shown is a mechanical coupling 5. The coupling may, however, be any means such that the instantaneous resonant frequency of the variable tuned circuit is relative to instantaneous altitude reading as indicated by the altimeter 1. The frequency range afforded by the variable oscillator 3 may be, for example, from a lower limit of 20 megacycles to an upper limit of 40 megacycles. The 20 megacycle limit may indicate zero altitude and the 40 megacycle limit may indicate an altitude of 10,000 feet. It is assumed, in explaining the operation of the present invention, that the interrogated aircraft's altitude is 7500 feet the altimeter 1 thereby tuning the variable oscillator 3 to 35 megacycles.

Ground station radar beacon pulses are generated by a transmitter 6 and are radiated by an associated antenna 8 to interrogate the aircraft. The interrogation pulses are received by a receiving antenna 7 and are directed to a pulse receiver 9 wherein the pulses are amplified. The output from the receiver 9 is coupled to a keying circuit 11 from which is obtained a substantially square wave pulse output. The keying circuit pulse is applied to the normally quiescent variable oscillator 3 initiating oscillations therein for the period of the substantially square wave pulse, at the frequency determined by the altimeter, namely 35 megacycles. The 35 megacycle output from the variable oscillator 3 is fed to a modulator unit 13 which excites a high-frequency transmitter 15 and amplitude-modulates the high-frequency carrier, to a depth of perhaps 80%, with the 35 megacycle sub-carrier. The resulting modulated signal is transmitted by the antenna 17 to the ground station in reply to the interrogation.

At the ground station, the high-frequency carrier, amplitude-modulated by the 35 megacycle sub-carrier, is received by a receiving antenna 21 and thence coupled to a mixer 23. The high-frequency carrier $c$ and the attendant sidebands $(c+35)$ and $(c-35)$ are heterodyned in the mixer 23 with an output from a fixed frequency oscillator 25 that is 30 megacycles below the high-frequency carrier $c$. As a result of the mixing, sum and difference beat frequencies are generated. The sum frequencies here serve no useful purpose and are discarded. The difference frequencies of 65 megacycles (30 megacycles, and 5 megacycles) are retained and fed to a filter unit 27 which passes only frequencies higher than 10 megacycles. The carrier and upper sideband difference frequencies of 30 megacycles and 65 megacycles, respectively, are coupled to a pair of selective amplifiers 29, 31. The 30 megacycle carrier difference frequency is amplified in a narrow band amplifier 29 (28 to 32 megacycles), and the 65 megacycle upper sideband frequency, which frequency may vary in accordance with altitude, is amplified in a wideband amplifier 31 (47.5 to 7.25 megacycles). The amplified 30 and 65 megacycle signals are beat together in a second mixer 33 thereby extracting a 35 megacycle difference frequency which equals the frequency of the 35 megacycle altitude indicating sub-carrier signal. It is preferable to amplify the carrier difference frequency 20 decibels above that of the upper sideband to reduce the effects of cross-modulation in mixing. The extracted sub-carrier is coupled to a selective filter 35 wherein channels are provided for the 35 megacycle sub-carrier signal to be filtered, and then amplified, detected, and applied to a suitably calibrated altitude indicating device. The circuitry for the amplifying, detecting, and indicating is not shown.

In summation, if the reply pulse is 10 microseconds long, the spectrum of the pulse is approximately two-tenths of a megacycle. Since the frequency variation afforded by the variable oscillator 3 is 20 megacycles, the accuracy of the altitude indicating system is approximately $\pm\frac{1}{2}\%$. Cross-modulation signals have relatively no effect on the system. If the aircraft high-frequency reply signal frequencies are unstable, the altitude indication is relatively unaffected since the difference between the carrier and sideband frequencies, which provides the desired indication, remains substantially constant. Thus the disclosed system has effectively good frequency stability, is accurate, and is efficient.

What is claimed is:

1. An aircraft altitude indicating system wherein a ground control station may ascertain the altitude of a given aircraft, said system comprising means, located at said ground control station, directionally transmitting electromagnetic pulse energy to said aircraft; and, located at said aircraft, means for receiving said energy, means responsive to said received pulse energy for producing a sub-carrier signal having a frequency proportional to said altitude of said aircraft, means for transmitting said sub-carrier frequency signal to said ground station; and, located at said ground station, means for receiving said sub-carrier frequency signal, and means for deriving an indication of said altitude of said aircraft from said received sub-carrier frequency signal.

2. An aircraft altitude indicating system wherein a ground control station may ascertain the altitude of a given aircraft, said system comprising means, located at said ground control station, directionally transmitting electromagnetic pulse energy to said aircraft; and, located at said aircraft, means for receiving said energy, an altimeter, a normally quiescent variable frequency sub-carrier oscillator, means responsive to said pulse receiving means exciting said normally quiescent oscillator producing a sub-carrier frequency signal, means coupling said altimeter to said normally quiescent variable frequency sub-carrier oscillator whereby the instantaneous resonant frequency of said oscillator is proportional to the instantaneous altitude indication of said altimeter, means for transmitting said sub-carrier frequency signal to said ground station; and, located at said ground station, means for receiving said sub-carrier frequency signal, and means for deriving an indication of said altitude of said aircraft from said received sub-carrier frequency signal.

3. A system as described in claim 2 wherein said means coupling said altimeter to said normally quiescent oscillator comprises a mechanical coupling.

4. A system as described in claim 2 including a keying circuit responsive to said received pulse energy to produce a substantially square wave output pulse, and means including said keying circuit for initiating oscillations of said sub-carrier oscillator at said frequency proportional to said instantaneous altimeter indication for the period of said substantially square wave pulse.

5. A system as described in claim 1 wherein said means, located at said aircraft, for transmitting said sub-carrier frequency signal to said ground station includes a transmitter for generating a relatively high-frequency carrier signal, means modulating said relatively high frequency carrier signal with said sub-carrier frequency signal.

6. A system as described in claim 5 including, at said ground station, a mixing device wherein said high frequency carrier signal, modulated by said sub-carrier signal, is heterodyned with a signal generated by a fixed frequency oscillator, and a selected plurality of modulation signals generated in said heterodyning are coupled to a filter unit.

7. A system as described in claim 6 including means selectively amplifying signals passed by said filter unit, said amplifying means including a narrow band amplifier for amplifying a modulation signal derived from said high-frequency carrier signal and a wideband amplifier for amplifying a modulation signal derived from said sub-carrier frequency signal.

8. A system as described in claim 7 wherein a pair of signals derived from said selective amplifying means are heterodyned together in a mixing device and the difference frequency extracted in said heterodyning is equal to said sub-carrier frequency, said extracted sub-carrier signal being applied to a selective filter channel.

9. For use in an aircraft altitude indicating system in which a control station directionally transmits electromagnetic pulse energy to aircraft located in an area serviced by said control station, apparatus for use on said aircraft comprising an altimeter, a normally quiescent variable frequency sub-carrier oscillator coupled to said altimeter whereby the instantaneous resonant frequency of a sub-carrier produced by said oscillator is proportional to the instantaneous altitude indication of said altimeter, means for receiving said transmitted electromagnetic pulse energy, means for utilizing said received pulse energy for exciting oscillations in said normally quiescent sub-carrier oscillator, a high-frequency transmitter, and means for modulating said high-frequency transmitter with the sub-carrier produced by said sub-carrier oscillator.

References Cited in the file of this patent

UNITED STATES PATENTS

| Number | Name | Date |
| --- | --- | --- |
| 2,312,203 | Wallace | Feb. 23, 1943 |
| 2,397,088 | Clay | Mar. 26, 1946 |
| 2,499,225 | Marshall | Feb. 28, 1950 |
| 2,501,109 | Wallace | Mar. 21, 1950 |
| 2,514,425 | Thompson | July 11, 1950 |
| 2,525,328 | Wolf | Oct. 10, 1950 |
| 2,531,412 | Deloraine | Nov. 28, 1950 |
| 2,546,985 | Dodington | Apr. 3, 1951 |
| 2,554,760 | Wallace | May 29, 1951 |
| 2,554,893 | Brunn | May 29, 1951 |
| 2,623,208 | Wallace | Dec. 23, 1952 |